United States Patent [19]
Riedhammer

[11] Patent Number: 6,029,531
[45] Date of Patent: Feb. 29, 2000

[54] GEAR CONTROL SYSTEM INTENDED IN PARTICULAR FOR AN ELECTRICALLY OPERATED AUTOMATIC TRANSMISSION OF LAYSHAFT DESIGN

[75] Inventor: Michael Riedhammer, Bermatingen, Germany

[73] Assignee: ZF Friedrichshafen AG, Friedrichshafen, Germany

[21] Appl. No.: 09/077,241

[22] PCT Filed: Dec. 5, 1996

[86] PCT No.: PCT/EP96/05435

§ 371 Date: May 22, 1998

§ 102(e) Date: May 22, 1998

[87] PCT Pub. No.: WO97/21945

PCT Pub. Date: Jun. 19, 1997

[30] Foreign Application Priority Data

Dec. 14, 1995 [DE] Germany ............................ 195 46 631

[51] Int. Cl.[7] ................................................. F16H 61/12
[52] U.S. Cl. ............................................................ 74/335
[58] Field of Search ................................................ 74/335

[56] References Cited

U.S. PATENT DOCUMENTS

| | | | |
|---|---|---|---|
| 4,827,806 | 5/1989 | Long et al. ................................ | 74/869 |
| 4,981,052 | 1/1991 | Giere ........................................ | 74/866 |
| 5,222,581 | 6/1993 | Paulsen .................................... | 74/335 |
| 5,492,027 | 2/1996 | Eaton ....................................... | 74/335 |
| 5,871,074 | 2/1999 | Easton ...................................... | 74/335 |
| 5,893,292 | 4/1999 | Lanting .................................... | 74/335 |
| 5,934,403 | 8/1999 | Moore et al. ............................. | 74/335 |

FOREIGN PATENT DOCUMENTS

| | | |
|---|---|---|
| 0 668 455 A1 | 8/1995 | European Pat. Off. . |
| 2 260 172 | 4/1993 | United Kingdom . |
| WO 88/01029 | 2/1988 | WIPO . |

*Primary Examiner*—Dirk Wright
*Attorney, Agent, or Firm*—Davis and Bujold

[57] ABSTRACT

A gear control system intended in particular for an electrically operated automatic transmission of layshaft design comprises the following elements: a hydraulic system with pressure lines; a pump (5) for generating a system pressure; a first pressure reduction valve (6) for adjusting the system pressure; and switching elements (1, 2, 3, 4) at least one of which takes the form of a higher gear (1) for forward drive, another takes the form of a lower gear (2) for forward drive, another takes the form of a switching element for reverse drive (3) and another takes the form of a clutch (4). The switching elements can be actuated by pressure via the pressure lines with pilot valves (10, 11, 12) and switching of one of the switching elements (1, 2, 3) or clutch (4) is defined by the switching position of the pilot valves (10, 11, 12) and of a multi-directional valve (16) connected upstream of the switching elements (1, 2, 3). The gear control system has a reserve switching device which in the event of a voltage drop applies pressure to the multi-directional valve (16) to switch one of the switching elements (1, 2, 3) for forward or reverse drive as well as a switch-back safety device which, when the reserve switching device is actuated, prevents switching back from a higher gear (1) to a lower gear (2) and an anti-transmission blocking switching device which, if the clutch (4) and one of the switching elements (1, 2, 3) are actuated simultaneously, shuts off the pressure supply to the pilot valve (12) of the clutch (4) and to the pilot valve (11) of the switching element (2) and switching element (3).

9 Claims, 2 Drawing Sheets

GEAR CONTROL SYSTEM INTENDED IN PARTICULAR FOR AN ELECTRICALLY OPERATED AUTOMATIC TRANSMISSION OF LAYSHAFT DESIGN

The invention relates to a gear control system intended in particular for electrically operated transmissions of layshaft design.

BACKGROUND OF THE INVENTION

In electrically operated automatic transmissions of layshaft design having hydraulically controlled switching elements, the hydraulic system is controlled by means of electric energy. But if for any reason, such as on account of a short circuit, the gear control system no longer is supplied with electric energy, operation will no longer be possible in transmissions of the above mentioned kind having a gear control system known from the practice, and this necessarily results in that a vehicle, that is equipped with such a transmission, will be unfit to move and will break down.

It is true that from the practice reserve devices are known in planetary transmissions which, in case of electric failure, make possible a gearshift by a linking of numerous valves in the transmission, but such a reserve device is very expensive and cannot be transferred to a transmission of layshaft design.

In an electrically operated automatic transmission, a failure of electricity, for example, due to a short circuit in the bypass cables, can also result in, due to the unintentional engagement of a valve caused by the short circuit, two switching elements to work against each other whereby, the transmission becomes blocked. At the same time, it can result in instabilities in the behavior of the vehicle and create a situation critical for safety in which a vehicle, for example, can skid of the road.

From the prior art, safety devices which prevent a blocking of the transmission, as consequence of a short circuit, are known only in planetary transmissions, and such safety devices are impossible to use in transmissions of layshaft design, such as used in autobuses and delivery vans.

In addition, the reserve and safety devices, which in the practice can be used only in planetary transmissions, have the disadvantage that, without considering the situation of the vehicle in which the failure of electricity occurs, when an emergency gear is engaged which often is too low for the actual velocity of the vehicle and thus, overspeeding of the engine can occur.

SUMMARY OF THE INVENTION

Therefore, the problem on which the instant invention is based is to provide a gear control system especially intended for a transmission of layshaft design or an electrical operated transmission which, even in case of failure of the electric supply of energy, ensures a safe and transmission-protected continuation of the vehicle state while avoiding blocking of the transmission and inadmissible switch backs.

The gear control system, according to the invention, makes advantageously possible for a transmission of layshaft design, which is considerably more reasonable in cost than, for example, a planetary transmission, to operate despite failure of the electric supply of energy so that a vehicle can move, for example, at least until reaching the nearest service station.

The gear control system, according to the invention, further makes possible in a transmission of layshaft design that blocking of the transmission, due to a short circuit, be prevented whereby, the operating safety of the vehicle is improved.

The gear control system, according to the invention, in addition stands out by the fact that even when activating the reserve device an inadmissible switch back, which in normal operation is prevented by the electronic system, is not possible so that the transmission parts concerned in the switching are protected also in the condition of emergency running.

The gear control system, according to the invention, with its reserve switching device, the switch back safety device and an anti-transmission blocking switching device solves a complex problem fully dismissed by the known gear control systems and yet, has a very simple and inexpensive construction which, in addition, is also easy to operate.

Other advantages and advantageous developments of the invention result from the sub-claims and the embodiment described below with reference to the drawing.

BRIEF DESCRIPTION OF THE DRAWING(S)

In the drawing:

FIG. 1 is a basic representation of a gear control system with reserve switching device, switch-back safety device and anti-transmission blocking switching device; and FIG. 2 is a diagrammatic basic representation of a variation of the anti-transmission blocking switching device of FIG. 1.

DESCRIPTION OF THE PREFERRED EMBODIMENT(S)

Figure 1:
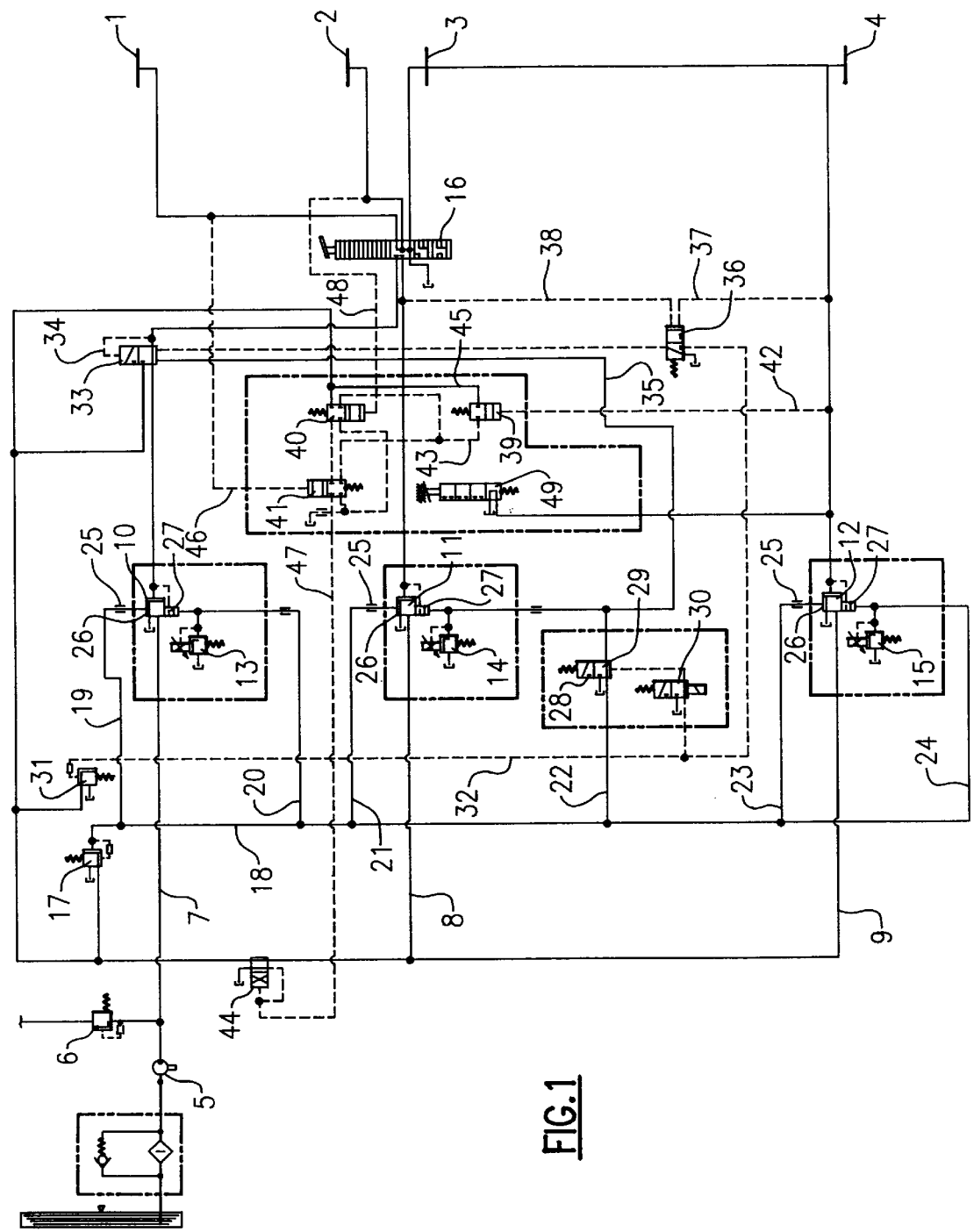

Referring to FIG. 1, there is shown a gear control system for a transmission of layshaft design having four hydraulically actuated switching elements 1, 2, 3, 4, and a system pressure being generated by a pump 5 for supplying pressure to the transmission. The system pressure here is first adjusted by a first pressure-reduction valve 6. Between the pump 5 or the pressure-reduction valve 6, the adjusted system pressure is passed via pressure lines 7, 8, 9 to the pilot valves 10, 11, 12 with the pressure-reduction valves 13, 14, 15, respectively, coordinated therewith, wherein with the pressure passed via the pilot valves 10 and 11, depending on the switching position of an inserted 6/6 multi-directional valve, one of the switching elements 1, 2, 3 is loaded, and with the pressure passed via the pilot valve 12, the switching element 4 can be loaded and thus actuated. In the instant embodiment according to FIG. 1, the switching elements 1, 2, 3, 4 are designed in such a manner that the switching element 1 represents a higher gear for forward drive, and the switching element 2, a lower gear for forward drive, while the switching element 3 is provided for a reverse drive, and the switching element 4 presents another clutch.

The switching of one of the switching elements 1, 2, 3 or of the clutch 4 is therefore defined by the switching position of the pilot valves 10, 11, 12 and of the multi-directional valve 16 connected upstream of the switching elements 1, 2, 3.

To switch the pilot valves 10, 11, 12, pre-control valves 13, 14, 15 are coordinated therewith, said pre-control valves 13, 14, 15 and the pilot valves 10, 11, 12 are loaded with a pilot pressure. To adjust the pilot pressure, the system pressure is accordingly reduced by a pressure-reduction valve 17. The pilot pressure is passed via control pressure lines 18, 19, 20, 21, 22, 23, 24, respectively, via an orifice 25 to switching pistons, not shown in detail in the drawing, in the pilot valves 10, 11, 12. On the side opposite to the side 26 of the pilot valves is respectively situated a spring element 27 having a switching surface. Thus, the same control pressure outcrops on both sides of the switching pistons, not shown in detail, in the pilot valves 10, 11, 12, of course, respectively over different pressure surfaces. The pressure fed to the pilot valves 10, 11, 12 from the side of the spring element 27 is controlled by the electrically actuatable current-proportional pressure pre-control valves 13, 14, 15.

If, for example, a pressure release occurs on one of the pre-control valves 13, 14, 15, another pilot valve 10, 11, 12 not coordinated with said pre-control valve is switched. Thus, in a normal operation the switching element or the clutch 4 can be actuated by free switching of the pilot valve 12, and with free switching of the pilot valve 11 it is possible, depending on the position of the 6/6 multi-directional valve 16, to switch the switching element 2 or 3.

The 6/6 directional valve 16 is mechanically actuatable and can, independently of the other switching conditions, pressurelessly adjust the switching elements or master clutches 1, 2 and feed to the switching element 3, for reverse drive, the pressure coming from the pilot valve 11.

If differing from the above described normal operating state, and if the current supply of the gear control fails, then upon detection of an electric voltage failure a reserve switching device is activated which feeds to the 6/6 multi-directional valve 16 pressure for switching one of the switching elements 1, 2, 3 for forward or reverse driving.

To this end, the reserve switching device has a valve 28 which is inserted in the control pressure line 22 leading to the spring element 27 of the pilot valve 11. A flow passage 29 built in the valve 28, which during normal operation is always open, is shut off by an electrically actuated valve 30 coordinated with the valve 28 in case of current or voltage failure. During normal operation, a pressure adjusted by another pressure-reduction valve 31 is passed through the valve 30 which, during normal behavior, switches the valve 28 to a passage position. With a failure of the electricity, for maintaining the passage position of the valve 28, the electrically actuated valve 30 is also unswitched whereby, the further passage of pressurized fluid, via a pressure line 32, is prevented. If the valves 28 and 30 are in a locking position, the control pressure acting upon the pilot valve 11 is unswitched which, in normal operation, would take place by a pressure-eliminating position or tank position of the pre-control valve 14. The consequence of this is that the pilot valve 11 is switched by the counter pressure to the control line 21 in such a manner that a switching pressure is fed to the 6/6 multi-directional valve 16. By the position thereof, it is possible in an emergency to actuate the pilot valve 2 for a forward drive or the pilot valve 3 for a reverse drive.

Because of its mechanical operability, the 6/6 multi-directional valve 16 is not affected by a current failure.

Thus, the switching elements 2 and 3 represent reserve gears when the reserve switching device is not activated.

If pressure is fed to the switching element 1 then, starting from a certain value, a valve 10 is switched to through-flow whereby system pressure is fed to the concerned switching element 1. Via a valve 33, coordinated with the switching element 1, there is maintained with a control line 34 the switched state of the switching element 1, which is provided for a higher gear, that is, for a higher velocity range even if the switching energy completely fails. In the unadjusted state, the valve 33, which is self-locking, is set back by the pressure coming from the valve 28, via a pressure line 35 to the unswitched position, and additional pressure controlled by a control valve 36. The valve 36 is actuated by a pressure in another control line 37, which is connected with the pressure line 9 leading to the switching element or the clutch 4, and a control line 38, which is connected with the switching pressure line 8 leading from the pilot valve 11 to the 6/6 multi-directional valve 16. The actuation pressure is conveniently within the range of the value needed to fill the switching element 2 or 4.

In the event of failure of electricity and during actuation of the reserve switching device, to prevent too low an emergency gear being introduced, the gear control system has a switch-back safety device with safety valves 39, 40, 41 wherein the safety valve 39 is connected with the pressure line 9 between the pilot valve 12 and the clutch 4, via a pressure line 42 and via a pressure line 43, with the safety valve 41 connected with the switching element 1 and with the safety valve 40 coordinated with the switching element 2.

The switch-back safety device is mainly important when driving at high velocity, that is, when in the instant embodiment the reserve switch device is activated to a switching position in which the switching element 1, which constitutes a higher gear, is engaged for forward drive. In case of current failure, in order that the reserve switching device is not driven back at high velocity from the switching element 1 to the switching element 2, which constitutes a lower gear, when activating the reserve switching device, the safety valves 39, 40, 41 are simultaneously switched and a locking valve 44 is actuated which shuts off the supply of pressure to the switching element 2 for slow forward drive.

Via the pilot valve 10 and the self-locking valve 33, situated in the pressure line between the pilot valve 10 and the switching element 1, the pressure load of the switching element 1 is maintained whereby, the highest gear remains engaged.

Due to the locking effect of the safety valves 39 and 40, the switching element 2 cannot be loaded with pressure.

If the reserve switching device is activated to a driving state in which the switching element 2 is actuated, the switching element also remains engaged.

To prevent the transmission from becoming blocked, as a result of inadvertence or two switching elements working against each other from a short circuit in the bypass cables (not shown), the gear control system has an anti-transmission blocking device which, during simultaneous actuation of the switching element or the clutch 4 and of the switching elements 1, 2, 3 the pressure feedline, is locked to the pilot valve 12 of the clutch 4 and to the pilot valve 11: of the switching element 2 for slow forward drive, and of the switching element 3 for reverse drive.

The safety valve 39 is designed here so as to be connected with the respective safety valve 40 or 41 coordinated with the other switching elements and to switch the locking valve 44 to a locking position.

If, as known per se, the clutch 4, for example, is loaded with pressure, via the pilot valve 12, the pressure in the line 9 leads not only to the clutch 4 but also to the safety valve 39. The safety valve 39 is thus unswitched and pressure outcropping on the safety valve 39 from a pressure line 45 is passed through to the pressure line 41 by the valve 39. The pressure line 43 distributes the pressure passed through to the safety valves 40 and 41.

If, due to inadvertence or short circuit, another pilot valve 10 or 11 is now actuated, then the switched safety valve 40 or 41 is likewise switched to the switching element concerned by the corresponding pressure.

To this end, pressure from a line 46 is fed to the safety valve 41 in order that the pressure fed to the safety valve 41 from the line 43 can be passed by the safety valve 41, and via a pressure line 47, to the locking valve 44 which then shuts off the pressure line to the switch pressure lines 8 and 9.

If in another variant the switching element 2 is switched, the safety valve 40 is loaded and switched via a pressure line 48 whereby the control pressure is further switched from the line 45 to the pilot valve 41. If now, for example, the pilot valve 10 is actuated by a short circuit, then the safety valve 41 is actuated by pressure from the pressure line 46 and the pressure switched through from the safety valve 40 is again passed on to the locking valve 44, in turn, actuated thereby.

The switching element 1 is not affected by the shut of f of pressure by the locking valve 44 since it represents the highest gear, the actuation of which represents no safety risk.

In the event that all three switching elements 1, 2, 3 are pressureless, the gear control system has, according to this embodiment, a 2/4 directional valve 49 switched in parallel to the pressure line 9 leading to the clutch 4 for maintaining the pressure load of the clutch 4.

Figure 2:
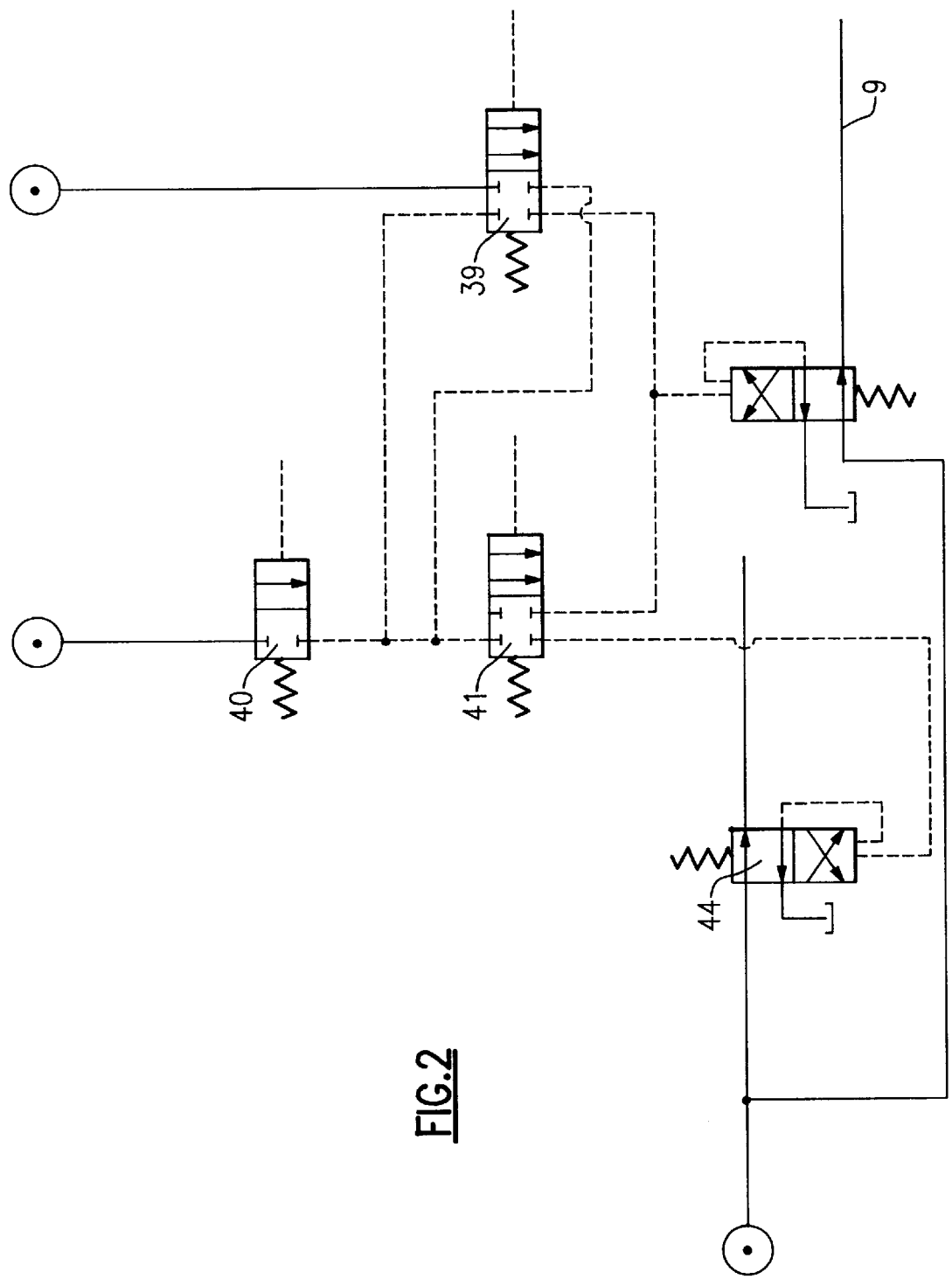

Referring to FIG. 2, it shows a variant of the gear control system of FIG. 1 where a control combination of the safety valves 39 and 40 or 39 and 41 leads via an additional locking valve 50 to unswitching of only the switching element 4 and the combination of the safety valves 36 or 37 unswitches only the switching element 2 and the combination of the safety valves 36 and 37 unswitches only the switching element 2.

If, for example, during operation of the switching element 1 the supply of energy fails, the switching element remains closed. But, at the same time, by the failure of the valve 30 the energy failure is detected and the pilot valve 11 will actuate the switching element 2. The effect of this is that the safety valves 40, 41 are simultaneously actuated and thus the locking valve 44 is switched to a locking position whereby an undesired switch back is prevented.

If, in the embodiment variants according to FIG. 2 shown here, for example, the switching elements 1 and 2 are simultaneously actuated, the safety valves 39 and 40 are loaded with pressure. At the same time, the safety valve 39 is switched by the pressure from a pressure line 51 to passage, the consequence of which is that pressure from the line 51 is passed, via a pressure line 52, to the additional locking valve 50 which is thus switched to a locking position. The pressure supply is thus shut off by the switch pressure line 9 to the pilot valve 12, which is coordinated with the clutch 4.

In the variants of the embodiment according to FIG. 2, it is possible, differing from the gear control system of FIG. 1 in which in any case the switching elements 2, 3 and 4 are unswitched by the locking valve 44, the switching element or the clutch 4 is separately unswitched. Hereby still other switching variants are possible since only during an unswitching of the clutch 4, for example, the switching element 2 can be actuated to a slow forward drive or the switching element 3 to a reverse drive, while in the embodiment of FIG. 1 the transmission with the switching elements 2, 3 and 4 is completely unswitched or switched to a neutral position. Thus, the variant of FIG. 2 represents an alternative to the anti-transmission blocking switching device of FIG. 1.

| Reference numerals | | | |
|---|---|---|---|
| 1 | switching element | 27 | spring element |
| 2 | switching element | 28 | valve |
| 3 | switching element | 29 | through flow opening of valve 28 |
| 4 | switching element | | |
| 5 | pump | 30 | valve |
| 6 | pressure-reduction valve | 31 | pressure reduction valve |
| 7 | switching pressure line | 32 | pressure line |
| 8 | switching pressure line | 33 | valve |
| 9 | switching pressure line | 34 | control line |
| 10 | pilot valve | 35 | control line |
| 11 | pilot valve | 36 | control line |
| 12 | pilot valve | 37 | control line |
| 13 | pre-control valve | 38 | control line |
| 14 | pre-control valve | 39 | safety valve |
| 15 | pre-control valve | 40 | safety valve |
| 16 | 6/6 multi-directional valve | 41 | safety valve |
| | | 42 | pressure line |
| 17 | pressure-reduction valve | 43 | pressure line |
| | | 44 | locking valve |
| 18 | control pressure line | 45 | pressure line |
| 19 | control pressure line | 46 | pressure line |
| 20 | control pressure line | 47 | pressure line |
| 21 | control pressure line | 48 | pressure line |
| 22 | control pressure line | 49 | 2/4 directional valve |
| 23 | control pressure line | 50 | locking valve |
| 24 | control pressure line | 51 | pressure line |
| 25 | orifice | 52 | pressure line |
| 26 | switch piston side | | |

What is claimed is:

1. A gear control system, for an electrically operated automatic transmission of layshaft design having a hydraulic system with pressure lines, a pump (5) to generate a system pressure, a first pressure-reduction valve (6) for adjusting the system pressure and first, second, third and fourth switching elements (1, 2, 3, 4) of which at least the first switching element (1) represents a higher gear for forward drive, the second switching element (2) represents a lower gear for forward drive and the third switching element (3) represents reverse drive, wherein the switching elements can be actuated with pressure via pressure lines by way of first, second and third pilot valves (10, 11, 12); wherein: the switching of one of the switching elements (1, 2, 3, 4) is controlled by the switching position of the pilot valves (10, 11, 12) and of a multi-directional valve (16) connected upstream of the switching elements (1, 2, 3), a reserve switching device (28, 29, 30) is provided which in the event of an electric voltage failure supplies pressure to the multi-directional valve (16) to switch one of the switching elements (1, 2, 3, 4) for the associated drive, a switch-back safety device (39, 40, 41) is provided which, when the reserve switching device (28, 29, 30) is actuated, prevents switch back from a higher gear to a lower gear, and wherein by means of an anti-transmission blocking switching device (39, 40, 41, 44) which upon simultaneous actuation of the fourth switching element (4) and one of the first, second and third switching elements and upon simultaneous actuation of the second and third switching elements (4 and 1, 2 or 3; or 2 and 3) shuts off a pressure supply to the third pilot valve (12) of the fourth switching element (4) and the second pilot valve (11) of the second switching element (2) of the lower gear for forward drive and of the third switching element (3) for reverse drive.

2. The gear control system according to claim 1, wherein the first, second and third pilot valves (10, 11, 12) can be pre-controlled by means of second, third and fourth pressure-reduction valves (13,14,15) respectively situated upstream of pilot valves (10,11,12) which can be adjusted by control pressure supplied via a fifth pressure-reduction valve (17).

3. The gear control system according to claim 1, wherein the reserve switching device (28, 29, 30) has a shut-off valve (28) which is in a control pressure line (22) which leads to one of the pilot valves (10,11,12), the shut-off valve (28) has a passage opening (29) which can be shut off by an electrically actuated valve (30) through which can pass a pressure which is regulated by a sixth pressure-reduction valve (31) situated between the electrically actuated valve (30) and the first pressure-reduction valve (6), wherein the shut-off valve (28) and the electrically actuated valve (30) interacting with the first pressure-reduction valve (6) are switched so that in normal operation they allow a pressurized fluid through-flow due to the electric voltage applied to the electrically actuated valve (30) and in case of voltage failure activate the reserve switching device (28, 29, 30) to shut-off the shut-off valve (28).

4. The gear control system according to claim 23, wherein during activation of the reserve switching device (28, 29,30), the switch pressure on the second pilot valve (11) is unswitched and the second pilot valve (11) is switched in a manner that via the multi-directional valve (16), which is mechanically actuatable, the first and second switching element (1, 2) can be actuated for forward drive or the third switching element (3) can be activated for reverse drive.

5. The gear control system according to claim 4, wherein a safety valve (39), connected with the pressure line (9) between the third pilot valve (12) and the fourth switching element (4), is provided which can be connected with a safety valve (41) connectable with the first switching element (1) and another safety valve (40) connectable with the second switching element (2).

6. The gear control system according to claim 1, wherein the switch-back safety device (39, 40, 41) is designed so that when the reserve switching device (28, 29, 30) is actuated to a switching position in which the first switching element (1) is switched for forward drive and the safety device (39, 40, 31) simultaneously switches and actuates a blocking valve (44) which shuts off the pressure supply to the second switching element (2).

7. The gear control system according to claim 5 wherein the first switching element (1) can be pressurized and remain switched via pressure line (7) with the first pilot valve (10) and a self-locking valve (33) situated in the pressure line between the first pilot valve (10) and the multi-directional valve (16).

8. The gear control system according to claim 5, wherein the anti-transmission blocking switching device (39, 40, 41, 44) operates so that when the fourth switching element (4) and one of the second and third switching elements (1, 2, 3) are simultaneously actuated, the safety valve (39) is switched so as to be connected with the respective safety valves (40) and (41) which are coordinated with the other switching elements and to switch the locking valve (44) to blocking position.

9. The gear control system according to claim 1, wherein the multi-directional valve (16) is a 6/6 directional valve and a 2/4 directional valve (49), connected upstream to the fourth switching element connected (4) to the pressure line (9), maintains the pressure load of the fourth switching element (4) when the first, second and third switching elements (1, 2, 3) lose pressure.

* * * * *